(12) United States Patent
Venkata Naga Ravi

(10) Patent No.: US 10,049,370 B2
(45) Date of Patent: Aug. 14, 2018

(54) TRANSFORMING CLOUD SERVICE MEASUREMENTS INTO ANONYMIZED EXTRAMURAL BUSINESS RANKINGS

(71) Applicant: Oracle International Corporation, Redwood Shores, CA (US)

(72) Inventor: Kiran Vedula Venkata Naga Ravi, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 937 days.

(21) Appl. No.: 14/053,287

(22) Filed: Oct. 14, 2013

(65) Prior Publication Data

US 2015/0106499 A1    Apr. 16, 2015

(51) Int. Cl.
| | |
|---|---|
| *G06F 15/173* | (2006.01) |
| *G06Q 10/00* | (2012.01) |
| *G06F 15/16* | (2006.01) |
| *G06Q 30/02* | (2012.01) |

(52) U.S. Cl.
CPC .................................. *G06Q 30/02* (2013.01)

(58) Field of Classification Search
CPC ...... G06F 11/3006; H04L 67/10; G06Q 30/02

USPC ......................................................... 709/224
See application file for complete search history.

(56) References Cited

U.S. PATENT DOCUMENTS

2012/0239739 A1* 9/2012 Manglik et al. .............. 709/203
2014/0058801 A1* 2/2014 Deodhar et al. ............. 705/7.38

* cited by examiner

*Primary Examiner* — Tonia L Dollinger
*Assistant Examiner* — Kishin G Belani
(74) *Attorney, Agent, or Firm* — Vista IP Law Group, LLP

(57) ABSTRACT

A method, system, and computer program product for computing cloud services. A method commences upon invocation of instrumentation configured to monitor a plurality of applications running in a cloud environment. The instruments are configured to capture a first set of metrics and a second set of metrics of respective cloud service tenants. The captured metrics are compared and the comparisons are used to perform a ranking. The rankings of the compared metrics are then used to compare cloud service tenants (e.g., a respective first cloud service tenant is compared with respect to a second cloud service tenant). The ranking is based at least in part on the compared metrics. The rankings can be fairly compared by selecting the first set of metrics with respect to the second set of metrics where both sets of metrics pertain to a common domain, and/or a common application, and/or a common application feature.

20 Claims, 8 Drawing Sheets

| Domain | Cloud Tenant | Application | Feature | Computation Formulas | Correlation Tables | |
|---|---|---|---|---|---|---|
| D1 | CT1 | SA1 | F1 | {C1, C2, C3} | Correlation{ | {C1, C2, C3}, <parameters> |
| D1 | CT1 | SA1 | F2 | {C1, C2} | Correlation{ | {C1, C2}, <parameters> |
| D1 | CT1 | SA2 | F1 | {C4, C5, C6} | Correlation{ | {C4, C5, C6}, <parameters> |
| D1 | CT1 | SA2 | F2 | {C4, C5} | Correlation{ | {C4, C5}, <parameters> |
| D1 | CT2 | SA3 | F3 | {C1, C2, C3} | Correlation{ | {C1, C2, C3}, <parameters> |
| D1 | CT2 | SA3 | F4 | {C1, C2} | Correlation{ | {C1, C2}, <parameters> |
| D1 | CT2 | SA4 | F3 | {C4, C5, C6} | Correlation{ | {C4, C5, C6}, <parameters> |
| D1 | CT2 | SA4 | F4 | {C4, C5} | Correlation{ | {C4, C5}, <parameters> |
| D1 | CT2 | SA5 | F5 | {C1, C2, C3} | Correlation{ | {C1, C2, C3}, <parameters> |
| D1 | CT2 | SA6 | F6 | {C1, C2} | Correlation{ | {C1, C2}, <parameters> |
| D2 | CT3 | SA2 | F7 | {C4, C5, C6} | Correlation{ | {C4, C5, C6}, <parameters> |
| D2 | CT3 | SA2 | F8 | {C4, C5} | Correlation{ | {C4, C5}, <parameters> |
| D2 | CT3 | SA3 | F5 | {C1, C2, C3} | Correlation{ | {C1, C2, C3}, <parameters> |
| D2 | CT4 | SA3 | F6 | {C1, C2} | Correlation{ | {C1, C2}, <parameters> |
| D2 | CT4 | SA4 | F7 | {C4, C5, C6} | Correlation{ | {C4, C5, C6}, <parameters> |
| D2 | CT4 | SA4 | F8 | {C4, C5} | Correlation{ | {C4, C5}, <parameters> |
| D2 | CT4 | SA1 | F1 | {C1, C2, C3} | Correlation{ | {C1, C2, C3}, <parameters> |

FIG. 3B

TRANSFORMING CLOUD SERVICE MEASUREMENTS INTO ANONYMIZED EXTRAMURAL BUSINESS RANKINGS

FIELD

The disclosure relates to the field of cloud-based computing services and more particularly to techniques for transforming cloud service measurements into anonymized extramural business rankings.

BACKGROUND

Business managers use metrics to manage aspects of their businesses. For example, a business might be managed to achieve quarterly earnings per share. Or, a business might be managed with an emphasis on attracting new customers in a given time period. In most cases, businesses compete with other businesses in the same domain, and often businesses compete with other businesses for the same types of customers.

While such businesses might be able to measure and compare quarter-on-quarter earnings per share or quarter-on-quarter changes in customer acquisition, and while such business might be able to rank business performance relative to peers (e.g., competing companies in the same industry or same size, or courting the same customer base, etc.), by the time the metrics are published (e.g., peers have published their respective performance metrics) and compared to obtain a ranking, it is usually quite late to take corrective action.

A better approach is to have a much faster way to obtain peer rankings, perhaps on a daily basis rather than a quarterly basis. Unfortunately most businesses do not collect and/or calculate and/or publish their results as frequently as day-by-day.

In the age of the Internet, and especially regarding businesses that use applications (e.g., web applications) to interact with players in their ecosystem (e.g., customers and suppliers), such businesses often use a cloud service to host their applications. This puts the cloud service vendor in a unique position to collect business metrics across multiple businesses (e.g., the multiple businesses being tenants of the cloud service vendor). Even more, the cloud service vendor is in a position to collect a vast amount of data pertaining to a wide range of aspects of the hosted applications. For example, a cloud service vendor can take granular measurements such as the number of sessions open at a given moment, or the rate at which a session is closed before a purchase is made, or the length of time spent in a session before a purchase is made, etc.

What is needed is a way to rapidly and continuously collect business metrics and to report normalized extramural business rankings. Legacy approaches fail to achieve the capabilities of the herein-disclosed techniques for transforming cloud service measurements into anonymized extramural business rankings. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for transforming cloud service measurements into anonymized extramural business rankings.

A method commences upon invocation of instrumentation (e.g., hardware and/or software instrumentation) configured to monitor (e.g., using a computer) a plurality of applications running in a cloud service computing environment. The instruments are configured to capture a first set of metrics and a second set of metrics of a respective pair (or more) of cloud service tenants. The captured metrics are compared (e.g., a first set of metrics is compared with respect to a second set of metrics) and the comparisons are used to perform a ranking. The rankings of the compared metrics are then used to compare and contrast cloud service tenants (e.g., a respective first cloud service tenant is compared with respect to a second cloud service tenant). The ranking is based at least in part on the compared metrics. The rankings can be fairly compared by selecting the first set of metrics with respect to the second set of metrics where both sets of metrics pertain to a common domain, and/or a common application, and/or a common application feature. Reports can be generated to report rankings as anonymized extramural business rankings.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 3B depicts a canonical calculation representation of computations as used to correlate computations to parameters in systems for transforming cloud service measurements into anonymized extramural business rankings, according to some embodiments.

DETAILED DESCRIPTION

Overview

Figure 1A:
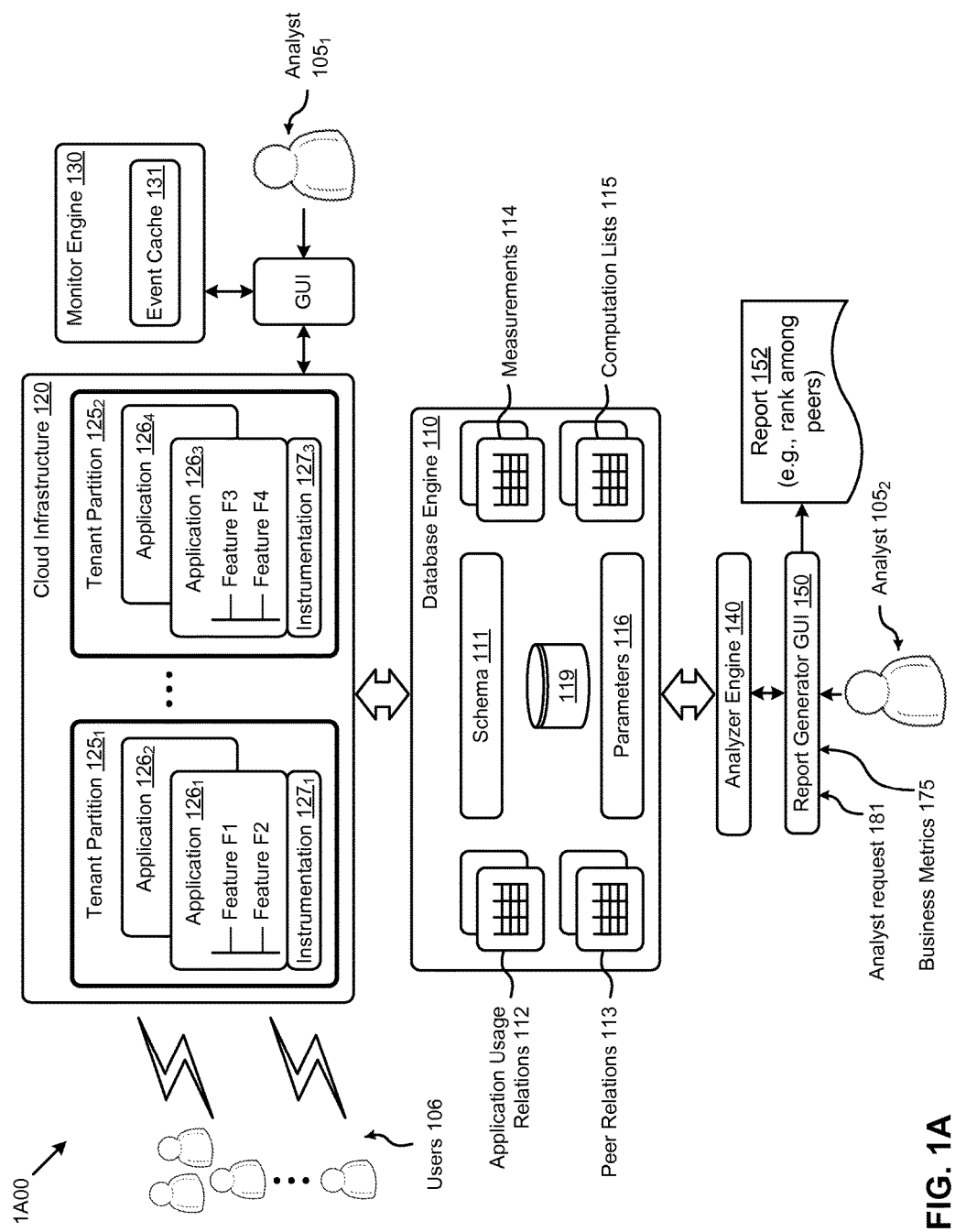
FIG. 1A depicts a cloud service environment for transforming cloud service measurements into anonymized extramural business rankings, according to some embodiments.

In the age of the Internet, and especially regarding businesses that use applications (e.g., web applications) to interact with players in their ecosystem (e.g., customers and suppliers), such businesses often use a cloud service to host their applications. This puts the cloud service vendor in a unique position to collect business metrics across multiple businesses (e.g., the multiple businesses being tenants of the cloud service vendor). Even more, the cloud service vendor is in a position to collect a vast amount of data pertaining to a wide range of aspects of the hosted applications. For example, a cloud service vendor can take granular measurements such as the number of sessions open at a given moment, or the rate at which a session is closed before a purchase is made, or the length of time spent in a session before a purchase is made, etc.

Business analysts (e.g., tenants of a cloud service vendor) often want to protect the privacy of their own data while still allowing such private data to be used in peer rankings. What is needed is a way to rapidly and continuously collect business metrics, and then to report anonymized and normalized extramural business rankings.

Normalization and protecting anonymity are not the only problems faced by business analysts. Table 1 gives a selection of problems and suggests solutions that can be implemented using techniques disclosed hereunder.

TABLE 1

Problems and suggested solutions

| Problems Faced by Business Analysts | Solutions Provided by a Cloud Vendor |
|---|---|
| Static data or high-latency data (e.g., quarterly reported data) may be too late for a business analyst to take remedial action | Low latency data (e.g., daily or hourly) can be retrieved "on-demand" |
| Financial results, even considering changes in results, are void of any correlation to reasons for the changes | Fine-grained business metrics are collected in real-time, and changes in the business metrics are correlated to other business metrics (e.g., to draw to causality) |
| Data needed to calculate peer rankings is difficult to obtain | The cloud vendor can produce anonymous peer rankings on demand |
| Data collected to calculate peer rankings is difficult to normalize | The cloud vendor is in a position to normalize the collected data, and is in a position to produce normalized peer rankings on demand |
| Application developers do not have access to ongoing measurements of session data (e.g., number of sessions, average time of a session, time to purchase, etc.) | The cloud vendor is in a position to collect session data and is in a position to correlate session data to application parameters on demand |
| Traditional metrics have a loose or non-existent correlation to remedial actions to be taken | User-network metrics (e.g., social network data) are collected in real-time, and changes in the collected metrics are correlated to other business metrics (e.g., to draw to causality) |

While, there have been many barriers to achieving privacy of data while still allowing private data to be used in anonymous peer rankings, many of the barriers are removed or resolved by use of the herein-disclosed techniques. For example, in the situation where a cloud vendor hosts applications for a large number of cloud customers, there may be many cloud customers in the same peer group (e.g., same industry, same size, same product or service, etc.). In such a situation the cloud vendor hosts the aforementioned applications, and is in a position to collect data pertaining to the running of the application, especially vis-à-vis the interactions between the application and users of the application.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts a cloud service environment 1A00 for transforming cloud service measurements into anonymized extramural business rankings. As an option, one or more instances of cloud service environment 1A00 or any aspect thereof may be implemented in the context of the architecture and functionality of the embodiments described herein.

As shown, cloud infrastructure 120 supports multiple partitions (e.g., tenant partitions $125_1$, tenant partition $125_2$, etc.). Within a particular partition, a cloud vendor customer (e.g., a tenant) can run any number of or variations of applications 126. For example, a particular tenant can allocate a partition to themselves, and the tenant can run applications (e.g., application $126_1$, application $126_2$) within the allocated partition. Another tenant can run applications (e.g., application $126_3$, application $126_4$) in a different tenant partition.

In exemplary scenarios described herein, users 106 interact with applications 126. During the course of execution of the applications 126, a monitor engine 130 captures aspects of performance and behavior occurring in the cloud infrastructure, possibly including traffic measurements, timing measurements, application behaviors, etc. Capture of certain application behaviors can be facilitated by instrumentation code (e.g., instrumentation $127_1$, instrumentation $127_3$, etc.) that can be included within and/or adjacent to the applications. The monitor engine 130 can be configured by an analyst $105_1$. For example, an analyst can use a graphical user interface (GUI) to interact with the monitor engine 130 and/or the instrumentation code in order to define a set of measurements (e.g., the herein-mentioned cloud service measurements), which measurements can be taken continuously during the operation of the applications. In some cases, the continuous capture of a particular measurement might demand high-frequency capture and storage, and in any such cases an event cache 131 might be used.

The cooperation of the elements within environment 1A00 provide a means by which business metrics 175 can be continuously collected in real-time or near-real time. The collected measurements can be stored using any known technique (e.g., in memory data structures, in files, in database tables, in database relations, etc.), and can be retrieved on demand and used in reports.

The shown environment 1A00 comprises a database engine 110. The database engine comprises a storage facility 119 that in turn serves to store various forms of data, including without limitation schema 111 and measurements 114, as well as relations pertaining to tenants (e.g., application usage relations 112, peer relations 113, computation lists 115, etc.). Such relations can be used to generate on-demand reports that include anonymized, normalized business rankings between the hosted tenants. For example, an analyzer engine 140 can retrieve any portion or portions of the aforementioned relations pertaining to tenants, and can perform various calculations (e.g., using computation lists 115). The results of such calculations can be accessed by a report generator (e.g., via a report generator GUI 150) in order to generate reports (e.g., report 152). The specific contents and formatting of such reports can be controlled by business analysts (e.g., analyst $105_2$).

As can be understood, the cooperation of the elements within environment 1A00 provide a means by which cloud service measurements can be continuously collected in real-time or near-real time, then transformed into reports suited for further analysis (e.g., human analysis and/or computer-aided analysis, etc.).

There are various ways in which the cloud service measurements can be transformed. In particular, the collected cloud service measurements can be transformed into anonymized extramural business rankings. An example of processing to effect such transformations are given in the following FIG. 1B.

Figure 1B:
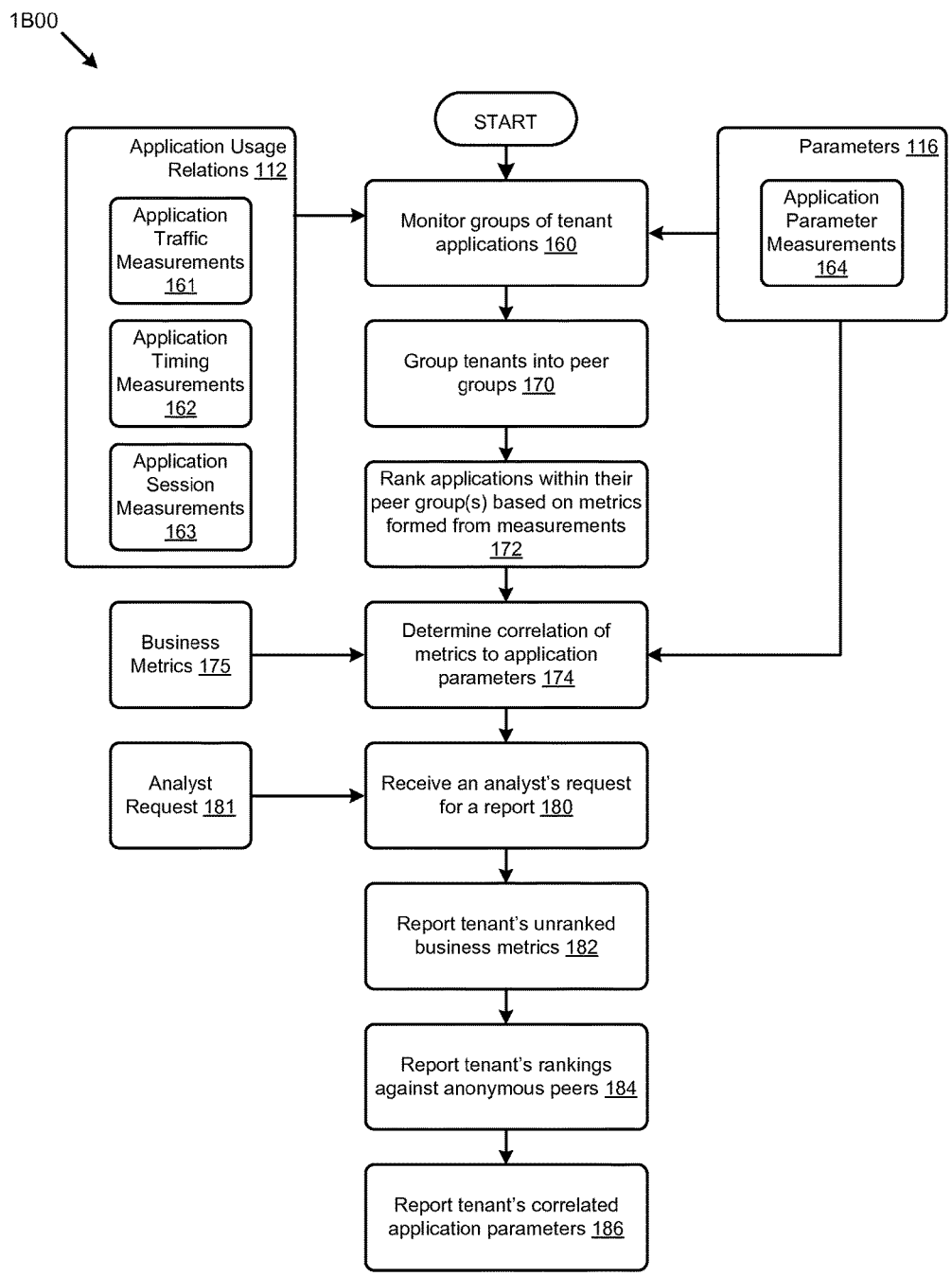
FIG. 1B depicts an example data and operation flow used for transforming cloud service measurements into anonymized extramural business rankings, according to some embodiments.

FIG. 1B depicts an example data and operation flow 1B00 used for transforming cloud service measurements into anonymized extramural business rankings. As an option, one or more instances of data and operation flow 1B00 or any aspect thereof may be implemented in the context of the architecture and functionality of the embodiments described herein. Also, the data and operation flow 1B00 or any aspect thereof may be implemented in any desired environment.

As shown, the operation flow 1B00 commences with initiation of an operation to monitor groups of tenant applications (see operation 160). For producing rankings, the selection of the groups of tenant applications is extramural (e.g., at least some of the monitored tenant applications are in different tenant partitions). Exemplary monitoring operations use various application usage data (e.g., application traffic measurements 161, application timing measurements 162, application session measurements 163, etc.). Further, exemplary monitoring operations take measurements of parameters 116 (e.g., various application parameter measurements 164). The measurements can correspond to business metrics. For example, a business analyst (e.g., a business analyst of a tenant) might manage a "call center" and might want to know how many calls came in to the call center in a particular month. Or, as another example, a business analyst might manage an internet commerce web portal for online shopping and might want to know how many product searches were performed per session. In some cases, a particular business metric can be derived from, or otherwise calculated, using parameters 116. Table 2 and Table 3 below list further examples of business metrics and parameters, respectively.

TABLE 2

Sample data
Customer: Acme.com Domain: Energy - Residential - Small

| Metric | Your Value | Overall Rank | Domain Rank | Correlated Parameters |
|---|---|---|---|---|
| # of calls/month | 100 | 10 | 6 | # of chat/month |
| # of calls (billing) | 50 | 20 | 3 | # of KM article access |
| Average search/user | 10 | 30 | 10 | # of interviews |

TABLE 3

Problems/solutions/benefits

| Problems | Solutions/Benefits |
|---|---|
| Customers do not know what they do not know | Customers are empowered. While retaining privacy, they have a broader insight into the industry in general. For example, the relative statistics indicate customer behavior (preference of channels) possible internal process improvements (quality of knowledge articles, process automation) via self service channel. |
| Relevancy of data presented to customers is not high | Relevancy is significantly improved. |
| No social/collaborative improvement of application features and their usage | Customers along with cloud vendor iteratively and continuously learn about the trends. Application features are measured and improvement of the features and their usage can be monitored. |
| Static data (quarterly reports) often may not reflect a significant change in customer behavior/market trend | On-demand/live data is available for making timely business decisions by customers. |

The foregoing examples are presented strictly for illustrative purposes and are not limiting.

In another operation shown in operation flow 1B00, tenants can be organized into groups (see operation 170). Such an operation 170 can be performed at any time, and need not necessarily follow performance of operation 160 as shown in operation flow 1B00. Continuing the foregoing example, suppose that a first tenant wants to know how many product searches were performed per session in its web portal application, and would further like to know its ranking among peers. To facilitate such a ranking, the tenants of cloud infrastructure 120 can be classified into peer groups. A tenant might be assigned a unique ID and entered into a table that classifies the tenant according to various dimensions. For example, a tenant can be classified as belonging to a particular industry, or of a particular size (e.g., number of employees) or corresponding to a particular geography, etc.). Table 4 depicts some such classifications for example tenants.

TABLE 4

Tenant domains

| Tenant ID | Industry/Vertical | Size (by # employees) | Geography |
|---|---|---|---|
| CT1 | Retail | Medium | California |
| CT2 | TELCO | Large | Nationwide |
| CT3 | Retail | Medium | California |

Such classifications can be used in further calculations. For example, and as shown, operation 172 serves to rank applications within a peer group based on metrics formed from or derived from the monitored measurements. Following the foregoing example, suppose that the aforementioned first tenant wants to know how many product searches were performed per session in its web portal application, and would further like to know its ranking among peers. Using peer relations (e.g., as exemplified in Table 4), the first tenant can reasonably be ranked against tenants of the same industry, size, and geography. Suppose that the web portal application of tenant CT1 has a measured value of "10", and another web portal application operated by tenant CT3 has a measured value of "15", and further suppose that the ranking formed by assigning a lower number (e.g., rank 1, rank 2, etc.) when the corresponding metric is lower. In this example, tenant CT1 has a value of "10" and CT3 has a value of "15", so tenant CT1 is ranked ahead of tenant CT3.

The foregoing example considers only one application type, namely web portal applications. However, a particular tenant may run many different applications on the same cloud infrastructure. Table 5 presents an exemplary correspondence between a tenant and its applications.

TABLE 5

Tenant applications

| Tenant ID | Application ID | Application Type |
|---|---|---|
| CT1 | SA1 | Retail portal (web portal) |
| CT1 | SA2 | Call Center (technical call center) |
| CT1 | SA3 | Call Center (billing call center) |
| CT2 | SA4 | Call Center (technical call center) |
| CT2 | SA5 | Call Center (billing call center) |
| CT3 | SA6 | Retail portal (web portal) |

Further, any of the tenant applications may have a correspondence to one or more business metrics. Table 6 depicts a correspondence between a tenant application and business metrics.

TABLE 6

Business metrics by application

| Tenant ID | Application Type | Business Metric |
|---|---|---|
| CT1 | Retail Portal (web portal) | Average Time Of Session |
| CT1 | Retail Portal (web portal) | Average Time Before Purchase Decision |
| CT1 | Call Center (technical call center) | Average Number Of Calls Per Call Center Operator |
| CT2 | Call Center (billing call center) | Average Wait Time |
| CT3 | Retail Portal (web portal) | Average Time Before Purchase Decision |

As can be seen, a particular application type can correspond to one or more business metrics, which in turn can be derived from, or otherwise calculated, using measurements 114 and parameters 116.

In many cases, an analyst might want to analyze more deeply to identify correlation and/or causation of the particular business metrics. For example, the business metric (e.g., "Average Wait Time" as calculated by computation C1) might be correlated to any one or more of a group of parameters (e.g., parameters 116). Continuing the current example, parameters might include "Average Number Of Operators Per Shift" and "Average Number Of Available Lines Per Shift". An operation such as the shown operation 174 can use data in a form such as is given in Table 6 in order to determine the correlation of metrics to parameters, and can perform exhaustive correlations of metrics to parameters.

In some cases any or all of operations shown as operation 160, operation 170, operation 172, and operation 174 operate repeatedly according to some periodic schedule (e.g., every day, or every hour). In other cases an analyst might select a particular time at which to make a request for a report (e.g., see analyst request 181). Such a request can come at any time, and such a request may comprise specific areas of interest to the analyst. For example, the analyst might want to know how the business metric "Average Wait Time" has changed over some given time period.

As shown, the operation 180 serves to receive an analyst's request, and then initiate respective report generation processing. For example, a report might comprise the value of a particular requested business metric for a particular tenant (e.g., see the action to report tenant's unranked business metrics of operation 182). Or, the operation 180 might receive an analyst's request and then initiate respective report generation processing to perform ranking of a particular requested business metric for a particular tenant with respect to that tenant's peers (e.g., see the action to report tenant's rankings against anonymous peers of operation 184).

A business metric might be self-defined by its nature (e.g., "Average Time Of Session"), or a business metric might arise from the results of one or more computations. Accordingly, various techniques such as are used in the data and operation flow 1B00 may encompass evaluation of any or all of the computations given in the computation list 115. A computation list can be formed using a table such as is exemplified in Table 7.

TABLE 7

Sample computation list

| Computation ID | Business Metric | Computation |
| --- | --- | --- |
| C1 | Average Wait Time | Time waited before answer/number of sessions |
| C2 | Average Time Of Session | =Total session time/number of sessions |
| C3 | Average Time Before Purchase Decision | =Total time elapsed in a session before purchase decision/number of sessions |
| C4 | Average Number Of Calls Per Call Center Operator | =Number of calls recorded in a time unit/number of call center operators on shift in that time unit |

Continuing with the discussion of operation 174, if an analyst wants to determine if there is a correlation and/or causation of the business metric "Average Wait Time" to any one or more parameters, the operation 174 serves to determine the correlation between:

Change in "Average wait time" and change in "average number of operators per shift"=85%.

Change in "Average wait time" and change in "average number of available lines per shift"=15%.

From such a correlation report, the analyst might recognize a causation relationship, namely that variations in the average wait time are more related (e.g., correlated) to "average number of operators per shift" than to "average number of available lines per shift".

The operation 180 serves to receive an analyst's request and then initiate respective report generation processing For example, a report might comprise the value of a particular requested business metric for a particular tenant (e.g., see the action to report tenant's unranked business metrics of operation 182). Or, the operation 180 might receive an analyst's request and then initiate respective report generation processing to perform ranking of a particular requested business metrics for a particular tenant with respect to the tenant's peers (e.g., see the action to report tenant's rankings against anonymous peers of operation 184). Or, the operation 180 might receive an analyst's request and then initiate respective report generation processing to result in a report comprising a correlation of some or all of a tenant's application parameters against the tenant's business metrics (e.g., see the action to report tenant's correlated application parameters of operation 186).

Further details regarding implementation of the aforementioned analyzer engine 140 and its related components are discussed below.

Figure 2:
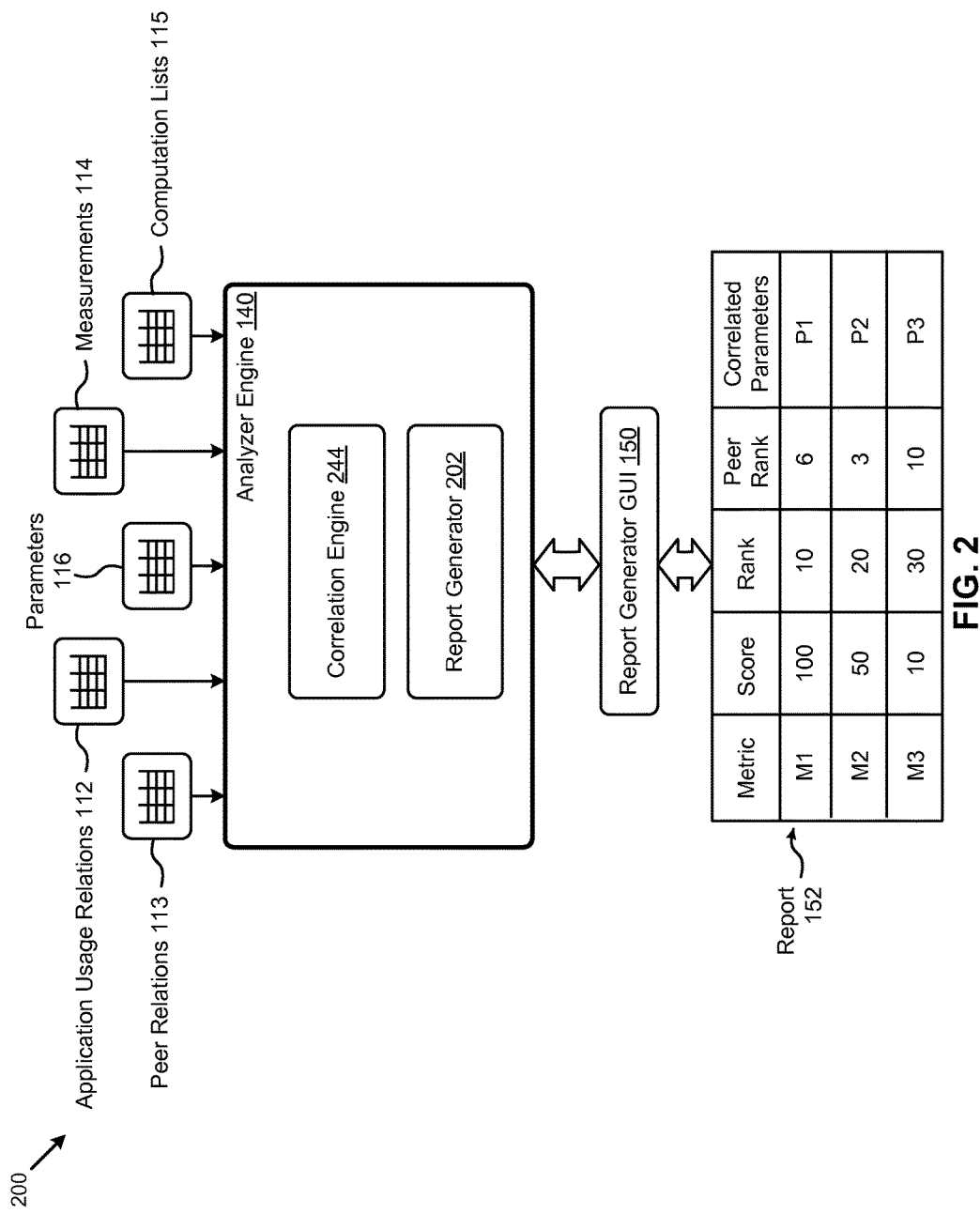
FIG. 2 depicts an environment including an analyzer engine used for transforming cloud service measurements into anonymized extramural business rankings, according to some embodiments.

FIG. 2 depicts an environment 200 including an analyzer engine used for transforming cloud service measurements into anonymized extramural business rankings. As an option, one or more instances of environment 200 or any aspect thereof may be implemented in the context of the architecture and functionality of the embodiments described herein. Also, the environment 200 or any aspect thereof may be implemented in any desired environment. For example, the environment 200 may comprise a server or other computing platform that is located remotely from the environment 100.

As shown, the analyzer engine 140 comprises a correlation engine 244 and a report generator 202. Outputs from the report generator include one or more instances of report 152. The analyzer engine is configured to receive inputs of data from any storage location. For example, the shown data items (e.g., application usage relation 112, measurements 114, peer relations 113, parameters 116, and the computation lists 115) can be retrieved from any location.

The report generator 202 can be configured via a report generator GUI 150, and the report generator GUI can display reports, and such reports can be printed on demand and/or can be codified into a markup language (e.g., XML) so as to facilitate communication with other systems. In some cases the correlation engine 244 serves to prepare metrics and correlation data for use by the report generator 202. In some cases, the correlation engine 244 serves to rank one cloud service tenant with respect to another cloud service tenant where the ranking is based at least in part on compared metrics.

As depicted, the correlation engine 244 serves to implement any one or more operations to calculate a correlation of metrics to parameters, and can perform correlations of metrics to parameters. Such calculations can include normalization. For example, if one computation calculates "Average Wait Time" in "minutes", and another one computation calculates "Average Wait Time" in "tenths of an hour", a common unit of time measurement (e.g., fraction of an hour) would be defined.

In some cases, a user may initiate an exhaustive correlation of metrics to parameters. In other cases, a user may initiate a correlation of metrics to parameters over a subset of parameter-metric pairs. In exemplary embodiments, correlation of metrics is performed over N tuples of data (e.g., where N is a user-defined or system-defined number). The confidence of a calculated correlation coefficient increases as N increases. Each correlation computation (e.g., a correlation between a particular parameter and a particular metric) determines a correlation coefficient (e.g., a value in the range 0.0 to 1.0). A correlation coefficient of 0.0 deems that the members of the tuples are unrelated (e.g., the particular parameter and the particular metric are not correlated). A value of 1.0 indicates they are highly related. Any known techniques for correlation computations can be used.

Using the aforementioned correlation techniques, a given cloud service tenant can interpret correlations between itself and the other of tenants that belong to the same domain and use the same application. As the number of other of tenants that belong to the same domain and use the same application increases, the cloud service tenant can get a more reliable correlation coefficient. For example, contrast the following call center situations:

Consider an isolated environment where there are measurements for only one cloud service tenant. Given reasonable correlations, the cloud service tenant would reach a conclusion that his "Average Wait Time" is dependent on the number of available phone lines (e.g., as a consequence of the isolated environment where only their own metrics are retrieved from only their own instances of the application).

However, when running in a cloud service environment with many tenants, the cloud service tenants might see that his peers (e.g., other cloud service tenants using the same application) are making use of knowledge management systems, web portals, and other techniques to deflect calls from the call center, thus reducing "Average Wait Time". Further, it might be determined that "Average Wait Time" has a significant correlation (e.g., an inverse correlation) with the number of knowledge management (KM) articles that have been accessed. Such a correlation would prompt an analyst looking at metrics to be aware of the fact that increasing the phone lines or agents may be an expensive option as compared to authoring and posting KM articles, and/or purchasing a KM subscription from the cloud vendor.

Using the aforementioned parameters, measurements and correlations, business rankings can be calculated. Various techniques and computations for transforming cloud service measurements into business rankings are presented below.

Figure 3A:
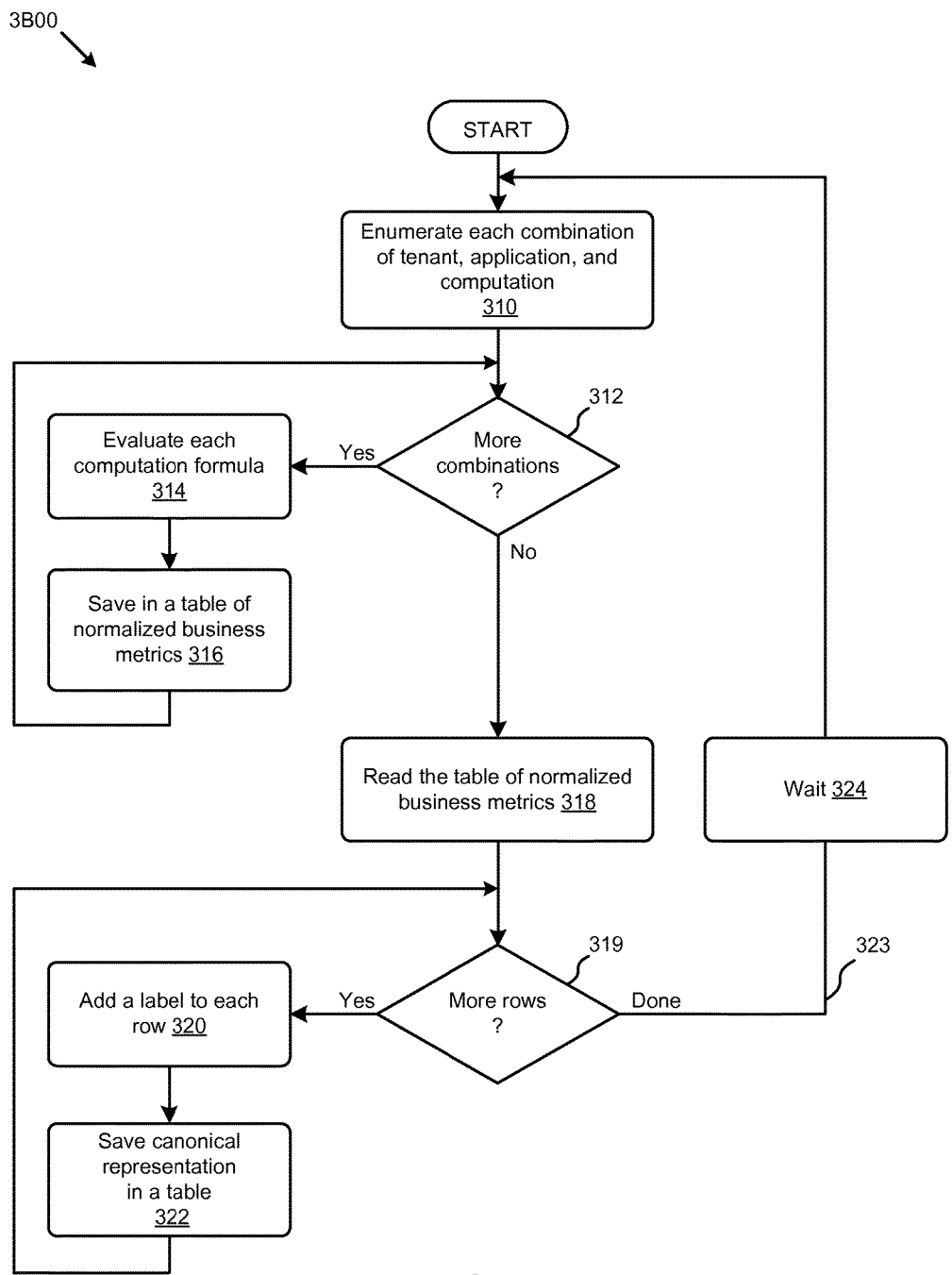
FIG. 3A is a flow chart of a technique for forming canonical representations of computations as used in systems for transforming cloud service measurements into anonymized extramural business rankings, according to some embodiments.

FIG. 3A is a flow chart 3A00 of a technique for forming canonical representations of computations as used in systems for transforming cloud service measurements into anonymized extramural business rankings. As an option, one or more instances of flow chart 3A00 or any aspect thereof may be implemented in the context of the architecture and functionality of the embodiments described herein. Also, the flow chart 3A00 or any aspect thereof may be implemented in any desired environment.

As shown, a particular canonical form of computations as used in systems for transforming cloud service measurements into anonymized extramural business rankings is given by enumeration of each combination of tenant, application and computation (see operation 310), then for each enumerated combination, decision 312 is entered, and for a particular enumerated combination, the computation formula of the combination is evaluated (see operation 314) and the result saved in a relation such as a table of normalized business metrics (see operation 316) before continuing. If there remain more entries in the enumerated combinations, then processing proceeds to labeling steps.

In exemplary cases, labeling is accomplished by reading the table of normalized business metrics (see operation 318) and adding a label column to the table of normalized business metrics (see operation 320), and then filling in cells in that column with an alphanumeric string (see operation 322). In some cases, the alphanumeric string is used as a key for retrieval of data mapped as a {key, data} tuple.

After determining that there are no more rows in the table of normalized business metrics to process (see decision 319) branch 323 is taken. The operations of flow chart 3A00 can be repeated at various time intervals (see wait operation 324), or the operations of flow chart 3A00 can be invoked at a moment in time just prior to satisfying a report request (e.g., see analyst request).

FIG. 3B depicts a canonical calculation representation 3B00 of computations as used to correlate computations to parameters in systems for transforming cloud service measurements into anonymized extramural business rankings. As an option, one or more instances of canonical calculation representation 3B00 or any aspect thereof may be implemented in the context of the architecture and functionality of the embodiments described herein. Also, the canonical calculation representation 3B00 or any aspect thereof may be implemented in any desired environment.

The foregoing embodiment of FIG. 3A specifies a canonical representation formed by the specific combination of {tenant, application, computation}, however other canonical representations are reasonable. For example, an analyst might want to know how performance/values of a particular business metric rank against performance/values of tenants operating in a different domain. As shown, the topmost row (see row 380) and the bottom row (see row 381) are different in that the specified domain and tenant are different, but row 380 and row 381 are the same in that the application (e.g., call center) is the same, and the feature is the same, and indicated computation formulas are the same. A comparison of the evaluated computations against each tenant's data would provide a reasonable comparison of how performance/values of the business metrics "C1", "C2" and "C3" for tenant CT1 rank against performance/values of tenant CT4, even though tenants CT1 and CT4 are operating in different domains (e.g., domain D1 and domain D2, respectively).

The foregoing is merely one possible inquiry formed by a business analyst that can be answered using the herein-disclosed techniques. Other inquiries can be satisfied (e.g., by a generated report) by using the herein-described techniques. Some such inquiries might be configured by an analyst using a configurator, which is now discussed.

Figure 4:
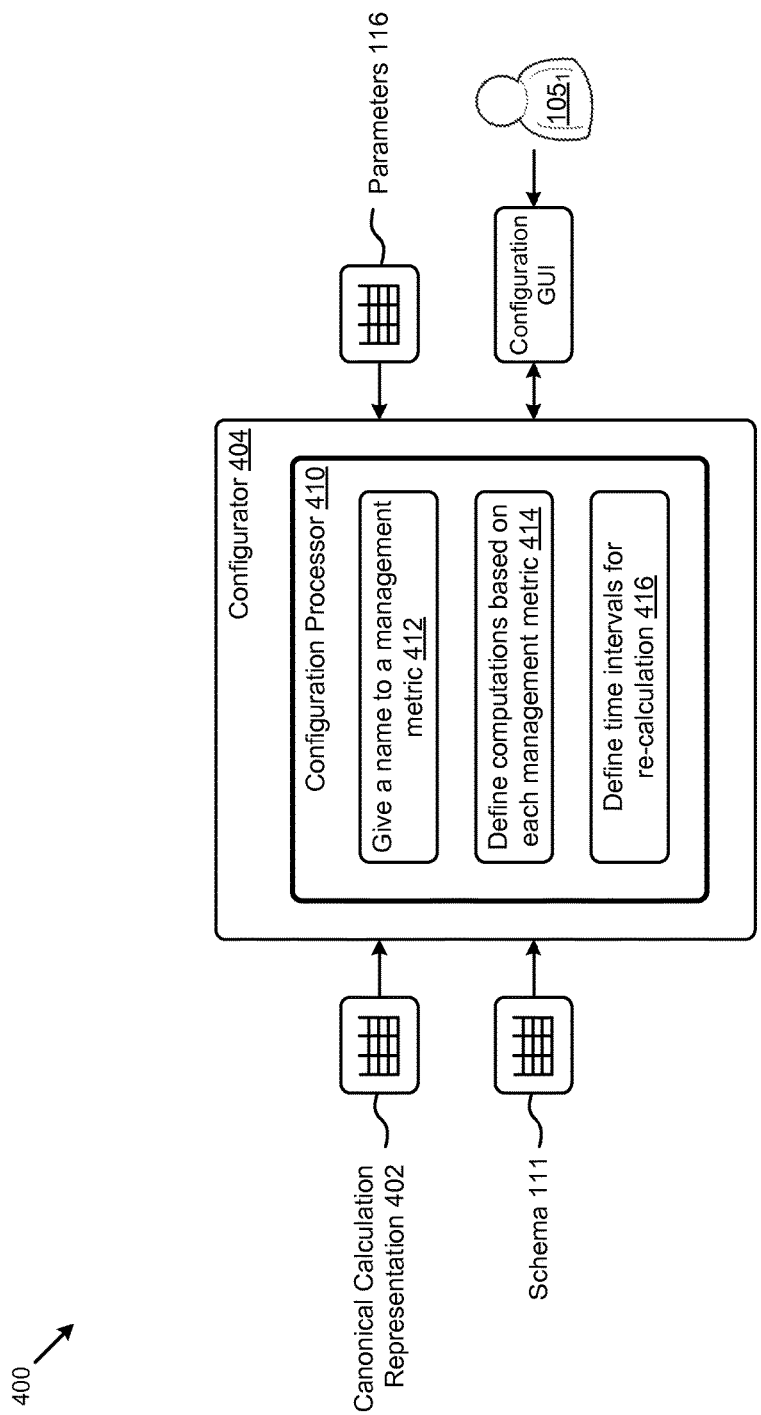
FIG. 4 depicts a configuration environment for configuring systems used for transforming cloud service measurements into anonymized extramural business rankings, according to some embodiments.

FIG. 4 depicts a configuration environment 400 for configuring systems used for transforming cloud service measurements into anonymized extramural business rankings. As an option, one or more instances of configuration environment 400 or any aspect thereof may be implemented in the context of the architecture and functionality of the embodiments described herein. Also, the configuration environment 400 or any aspect thereof may be implemented in any desired environment.

As shown, the configuration environment 400 comprises a configurator 404, which in turn comprises several operational units. In the specific partitioning shown, a configuration processor 410 can receive any instances of parameters 116, a canonical calculation representation 402, and a use model. An analyst operates a configuration GIU. Configuration can include:
  An operation to give a name to a management metric (see operation 412),
  An operation to define computations based on the named management metrics (see operation 414), and
  An operation to define time intervals for recalculation of the identified computations 416.

Figure 5:
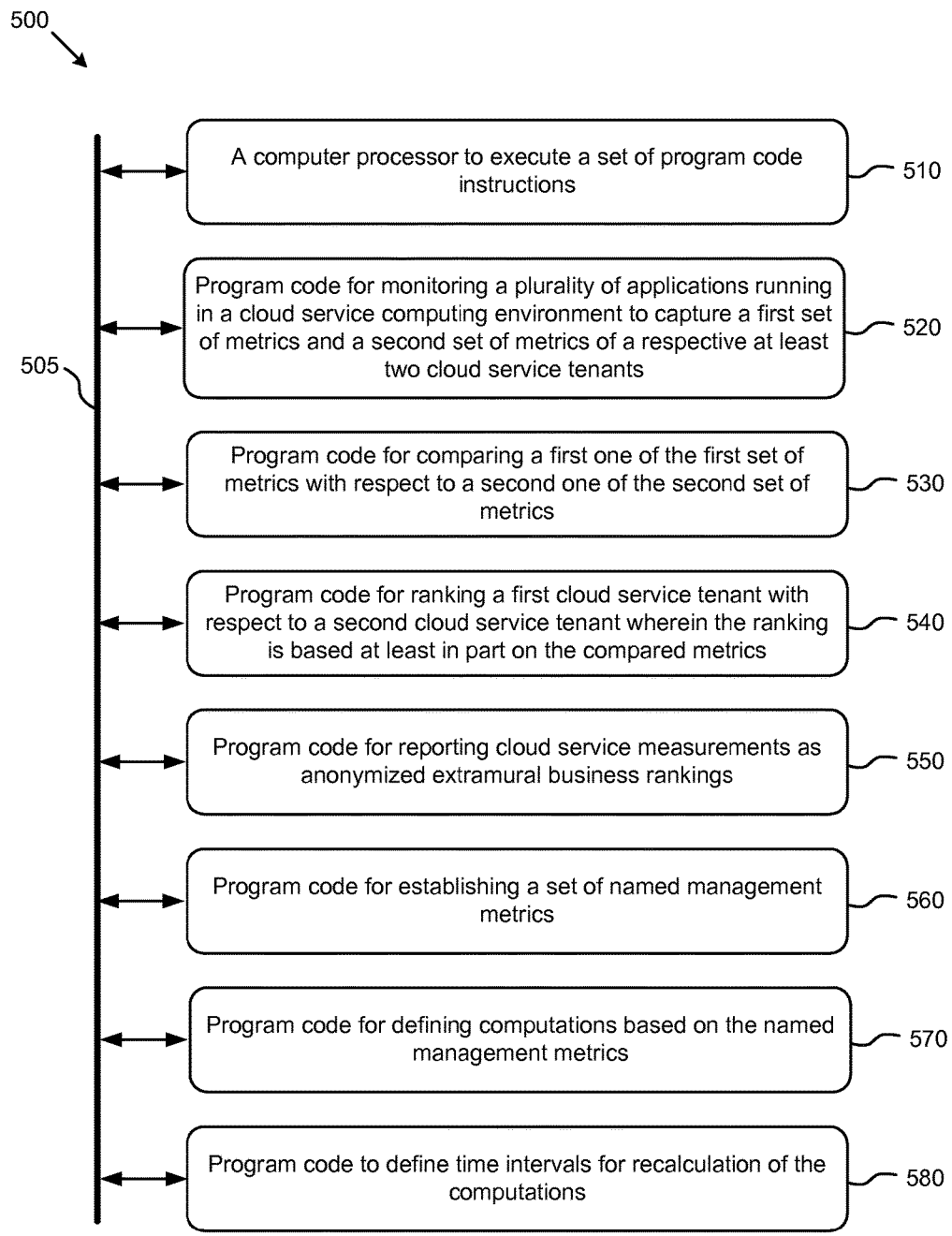
FIG. 5 is a block diagram of a system for transforming cloud service measurements into anonymized extramural business rankings, according to some embodiments.

Additional Embodiments of the Disclosure
Additional Practical Application Examples FIG. 5 is a block diagram of a system 500 for transforming cloud service measurements into anonymized extramural business rankings, according to some embodiments. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims.

The embodiment of FIG. 5 implements a portion of a computer system, shown as system 500, comprising a computer processor to execute a set of program code instructions (see module 510) and modules for accessing memory to hold program code instructions to perform: monitoring, using a computer, a plurality of applications running in a cloud service computing environment to capture a first set of metrics and a second set of metrics of a respective at least two cloud service tenants (see module 520); comparing a first one of the first set of metrics with respect to a second one of the second set of metrics (see module 530); and ranking a first cloud service tenant with respect to a second cloud service tenant where the ranking is based at least in part on the compared metrics (see module 540).

In the embodiment of system 500, the system further comprises program code and/or operations for:
- reporting cloud service measurements as anonymized extramural business rankings (see module 550);
- establishing a set of named management metrics (see module 560);
- defining computations based on the named management metrics (see module 570); and
- defining time intervals for recalculation of computations (see module 580).

System Architecture Overview
Additional System Architecture Examples

Figure 6:
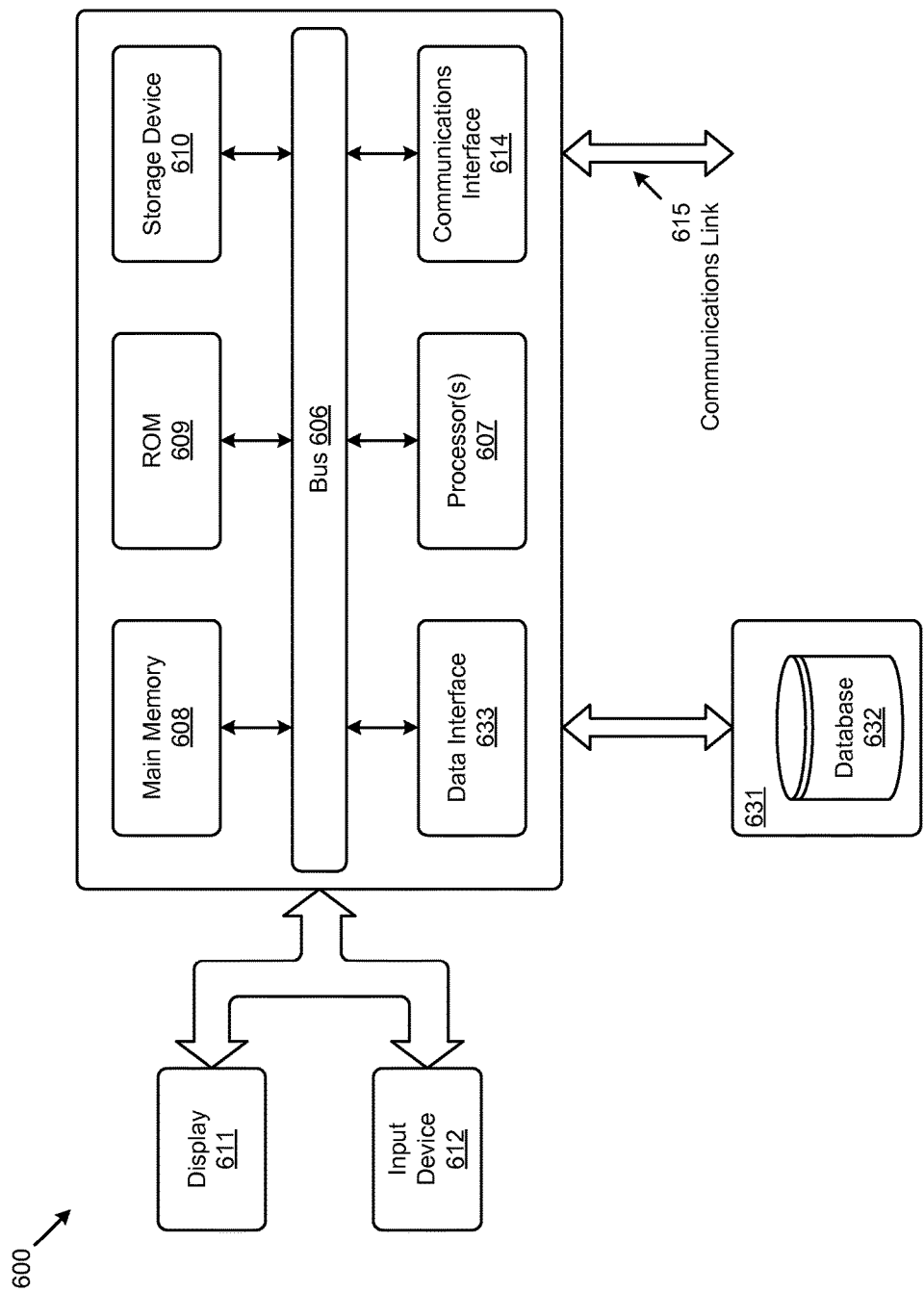
FIG. 6 depicts a block diagram of an instance of a computer system suitable for implementing an embodiment of the present disclosure.

FIG. 6 depicts a block diagram of an instance of a computer system 600 suitable for implementing an embodiment of the present disclosure. Computer system 600 includes a bus 606 or other communication mechanism for communicating information, which interconnects subsystems and devices, such as a processor 607, a system memory 608 (e.g., RAM), a static storage device (e.g., ROM 609), a disk drive 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory 608. Such instructions may be read into system memory 608 from another computer readable/usable medium, such as a static storage device or a disk drive 610. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to certain embodiments of the disclosure, two or more computer systems 600 coupled by a communications link 615 (e.g., LAN, PTSN, or wireless network) may perform the sequence of instructions required to practice the disclosure in coordination with one another.

Computer system 600 may transmit and receive messages, data, and instructions, including programs (e.g., application code), through communications link 615 and communication interface 614. Received program code may be executed by processor 607 as it is received, and/or stored in disk drive 610 or other non-volatile storage for later execution. Computer system 600 may communicate through a data interface 633 to a database 632 on an external data repository 631. A module as used herein can be implemented using any mix of any portions of the system memory 608, and any extent of hard-wired circuitry including hard-wired circuitry embodied as a processor 607.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method comprising:
monitoring, using a computer, a plurality of applications running in a cloud service computing environment to capture a first set of metrics of a respective first cloud service tenant and a second set of metrics of a respective second cloud service tenant;
comparing a first metric of the first set of metrics with respect to a second metric of the second set of metrics to generate comparison metrics; and
ranking a first cloud service tenant with respect to a second cloud service tenant wherein the ranking is based at least in part on the comparison metrics.

2. The method of claim 1, further comprising reporting cloud service measurements as anonymized rankings.

3. The method of claim 1, further comprising reporting cloud service measurements as extramural business rankings.

4. The method of claim 1, wherein the monitoring comprises capturing data pertaining to execution of two applications of two respective cloud service tenants.

5. The method of claim 1, wherein the respective first and second cloud service tenants share a domain.

6. The method of claim 1, wherein the first set of metrics and the second set of metrics comprise at least one of, an average wait time metric, an average number of operators per shift, and an average number of available lines per shift.

7. The method of claim 1, wherein the comparing uses a canonical form of computations.

8. The method of claim 1, wherein the comparing uses an application feature.

9. The method of claim 1, further comprising a least one of, a configuration to establish named management metrics, a configuration to define computations based at least in part on the named management metrics, a configuration to identify computations to be recalculated, and an operation to define time intervals for recalculation of the computations.

10. A computer program product embodied in a non-transitory computer readable medium, the non-transitory computer readable medium having stored thereon a sequence of instructions which, when executed by a processor causes the processor to execute a process, the process comprising:
monitoring, using a computer, a plurality of applications running in a cloud service computing environment to capture a first set of metrics of a respective first cloud service tenant and a second set of metrics of a respective second cloud service tenant;

comparing a first metric of the first set of metrics with respect to a second metric of the second set of metrics to generate comparison metrics; and ranking a first cloud service tenant with respect to a second cloud service tenant wherein the ranking is based at least in part on the comparison metrics.

11. The computer program product of claim 10, further comprising reporting cloud service measurements as anonymized rankings.

12. The computer program product of claim 10, further comprising reporting cloud service measurements as extramural business rankings.

13. The computer program product of claim 10, wherein the monitoring comprises capturing data pertaining to execution of two applications of two respective cloud service tenants.

14. The computer program product of claim 10, wherein the respective first and second cloud service tenants share a domain.

15. The computer program product of claim 10, wherein the first set of metrics and the second set of metrics comprise at least one of, an average wait time metric, an average number of operators per shift, and an average number of available lines per shift.

16. The computer program product of claim 10, wherein the comparing uses a canonical form of computations.

17. The computer program product of claim 10, wherein the comparing uses an application feature.

18. The computer program product of claim 10, further comprising a least one of, a configuration to establish named management metrics, a configuration to define computations based at least in part on the named management metrics, a configuration to identify computations to be recalculated, and an operation to define time intervals for recalculation of the computations.

19. A computer system comprising:

a cloud computing environment hosting a plurality of applications;

a monitor engine to monitor the applications and capture a first set of metrics pertaining to a respective first cloud service tenant and a second set of metrics pertaining to a second cloud service tenant;

an analyzer engine to compare a first metric of the first set of metrics with respect to a second metric of the second set of metrics to generate comparison metrics; and a correlation engine to rank a first cloud service tenant with respect to a second cloud service tenant wherein the ranking is based at least in part on the comparison metrics.

20. The computer system of claim 19, further comprising a report generator to report cloud service measurements as anonymized rankings.

* * * * *

UNITED STATES PATENT AND TRADEMARK OFFICE
CERTIFICATE OF CORRECTION

PATENT NO. : 10,049,370 B2
APPLICATION NO. : 14/053287
DATED : August 14, 2018
INVENTOR(S) : Venkata Naga Ravi Page 1 of 1

It is certified that error appears in the above-identified patent and that said Letters Patent is hereby corrected as shown below:

In the Specification

In Column 9, Line 32, delete "processing" and insert -- processing. --, therefor.

In Column 12, Line 24, delete "GIU." and insert -- GUI. --, therefor.

In Column 13, Line 60, delete "PTSN," and insert -- PSTN, --, therefor.

Signed and Sealed this
Fourteenth Day of May, 2019

Andrei Iancu
*Director of the United States Patent and Trademark Office*